United States Patent
Fujita

(10) Patent No.: US 9,345,062 B2
(45) Date of Patent: May 17, 2016

(54) RELAY SYSTEM, RELAY DEVICE, AND CONTROL METHOD AND CONTROL PROGRAM OF RELAY DEVICE

(71) Applicant: FUJITSU LIMITED, Kawasaki-shi, Kanagawa (JP)

(72) Inventor: Masaki Fujita, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 246 days.

(21) Appl. No.: 13/852,018

(22) Filed: Mar. 28, 2013

(65) Prior Publication Data

US 2013/0208651 A1 Aug. 15, 2013

Related U.S. Application Data

(63) Continuation of application No. PCT/JP2010/066994, filed on Sep. 29, 2010.

(51) Int. Cl.
*H04W 88/04* (2009.01)
*H04B 7/155* (2006.01)

(52) U.S. Cl.
CPC .............. *H04W 88/04* (2013.01); *H04B 7/155* (2013.01)

(58) Field of Classification Search
CPC ....... H04W 88/00; H04W 88/04; H04B 7/155
USPC ......................................................... 370/315
See application file for complete search history.

(56) References Cited

U.S. PATENT DOCUMENTS

| 7,885,925 | B1 * | 2/2011 | Strong | G06F 17/30038 707/620 |
| 7,945,750 | B2 * | 5/2011 | Arakawa et al. | 711/162 |
| 2006/0173932 | A1 * | 8/2006 | Cortright et al. | 707/204 |
| 2007/0113086 | A1 * | 5/2007 | Huang et al. | 713/168 |
| 2008/0134301 | A1 * | 6/2008 | Kataoka et al. | 726/4 |
| 2008/0155082 | A1 * | 6/2008 | Ohtani et al. | 709/223 |
| 2010/0095354 | A1 * | 4/2010 | Uchida | G06F 21/6227 726/4 |
| 2011/0060864 | A1 * | 3/2011 | Yoshii et al. | 711/103 |

FOREIGN PATENT DOCUMENTS

| JP | 9-146861 | | 6/1997 |
| JP | 11-15716 | | 1/1999 |
| JP | 11-015716 | * | 1/1999 |
| JP | 11-161603 | | 6/1999 |
| JP | 2002-334033 | | 11/2002 |
| JP | 2006-221224 | | 8/2006 |
| WO | 01/98904 A1 | | 12/2001 |

OTHER PUBLICATIONS

International Search Report of Corresponding PCT Application PCT/JP2010/066994 mailed Oct. 26, 2010.
Office Action mailed Aug. 6, 2013 in corresponding Japanese Application No. 2012-536063.

* cited by examiner

*Primary Examiner* — Andrew Lai
*Assistant Examiner* — Sumitra Ganguly
(74) *Attorney, Agent, or Firm* — Staas & Halsey LLP

(57) ABSTRACT

A relay device arranged between a plurality of terminal devices and a file device for relaying data communication, includes: a storage unit configured to store a change history of each piece of data acquired from the file device by a request from the terminal device; a communication unit; and a computation processing unit configured to, in a case where a change history of first data acquired from the file device by a request from a first terminal device is different from a change history of second data having the same file name as the first data acquired from the file device after acquisition of the first data by the first terminal device by a request from a second terminal device, control and cause the communication unit to notify the first terminal device that the first data is changed to the second data.

3 Claims, 14 Drawing Sheets

| USER ID | PASSWORD | MAIL ADDRESS |
|---|---|---|
| aaa | ghi-1234 | xxxx@fujitsu.com |
| bbb | def-3456 | yyyy@fujitsu.com |
| ccc | opq-9876 | zzzz@fujitsu.com |
| ... | ... | ... |
| | | |

FIG. 6

| MAIL ADDRESS | FILE NAME | VL |
|---|---|---|
| xxxx@fujitsu.com | SOFTWARE AA | V20L10 |
| yyyy@fujitsu.com | SOFTWARE AA | V21L10 |
| zzzz@fujitsu.com | ... | ... |
| ... | ... | ... |
| | | |

RELAY SYSTEM, RELAY DEVICE, AND CONTROL METHOD AND CONTROL PROGRAM OF RELAY DEVICE

CROSS-REFERENCE TO RELATED APPLICATIONS

This application is a continuation application of Internal Application PCT/JP2010/066994 filed on Sep. 29, 2010 and designated the U.S., the entire contents of which are incorporated herein by reference.

FIELD

The present invention relates to a relay system, a relay device, and a control method and a control program of a relay device.

BACKGROUND

In recent years, in the field of information processing technology, a file server is known. A file server is a computer configured to provide a file stored in a storage device within the server to a client. A client is a computer that makes use of file services provided by the file server. A file is a set of data recorded on a storage device with which an OS (Operating System) performs inputting and outputting and mention is made of a program file, which is a set of commands that a computer can execute, a data file to record information created by a user of the computer, etc.

The file stored in the file server can be accessed from a plurality of clients, and therefore, it is possible for the file server to completely manage data accessed by a plurality of clients in a sharing manner.

The file server performs processing to accumulate a history of download of a file stored in the storage device by a client, and also performs processing to check an update history of the file stored within the server by polling.

There is a case where a relay server that relays communication between a file server and a client is connected therebetween. The relay server relays communication between the file server and the client by connecting with the Internet in place of the client in an internal network that does not connect with the Internet directly. The relay server performs history accumulation to accumulate a history of download of a file from the file server by a client. Further, the relay server notifies the client of history update information at a timing when a request to check the history update is made from the client.

RELATED DOCUMENTS

[Patent Document 1] Japanese Laid-open Patent Publication No. 2002-334033
[Patent Document 2] Japanese Laid-open Patent Publication No. 2006-221224
[Patent Document 3] Japanese Laid-open Patent Publication No. H11-161603

SUMMARY

The disclosed relay device is arranged between a plurality of terminal devices and a file device and relays data communication between the terminal device and the file device. The relay device includes: a storage unit configured to store a change history of each piece of data acquired from the file device by a request from the terminal device; a communication unit configured to perform transmission or reception of data with the plurality of terminal devices and the file device; and a computation processing unit configured to, in a case where a change history of first data acquired from the file device by a request from a first terminal device of the plurality of terminal devices is different from a change history of second data having the same file name as the first data acquired from the file device after acquisition of the first data by the first terminal device by a request from a second terminal device of the plurality of terminal devices, control and cause the communication unit to notify the first terminal device that the first data is changed to the second data.

The object and advantages of the embodiments will be realized and attained by means of the elements and combination particularly pointed out in the claims.

It is to be understood that both the foregoing general description and the following detailed description are exemplary and explanatory and are not restrictive of the invention, as claimed.

BRIEF DESCRIPTION OF THE DRAWINGS

FIG. 6 is a diagram illustrating an example of a history table.

EMBODIMENTS FOR CARRYING OUT THE INVENTION

Figure 1:
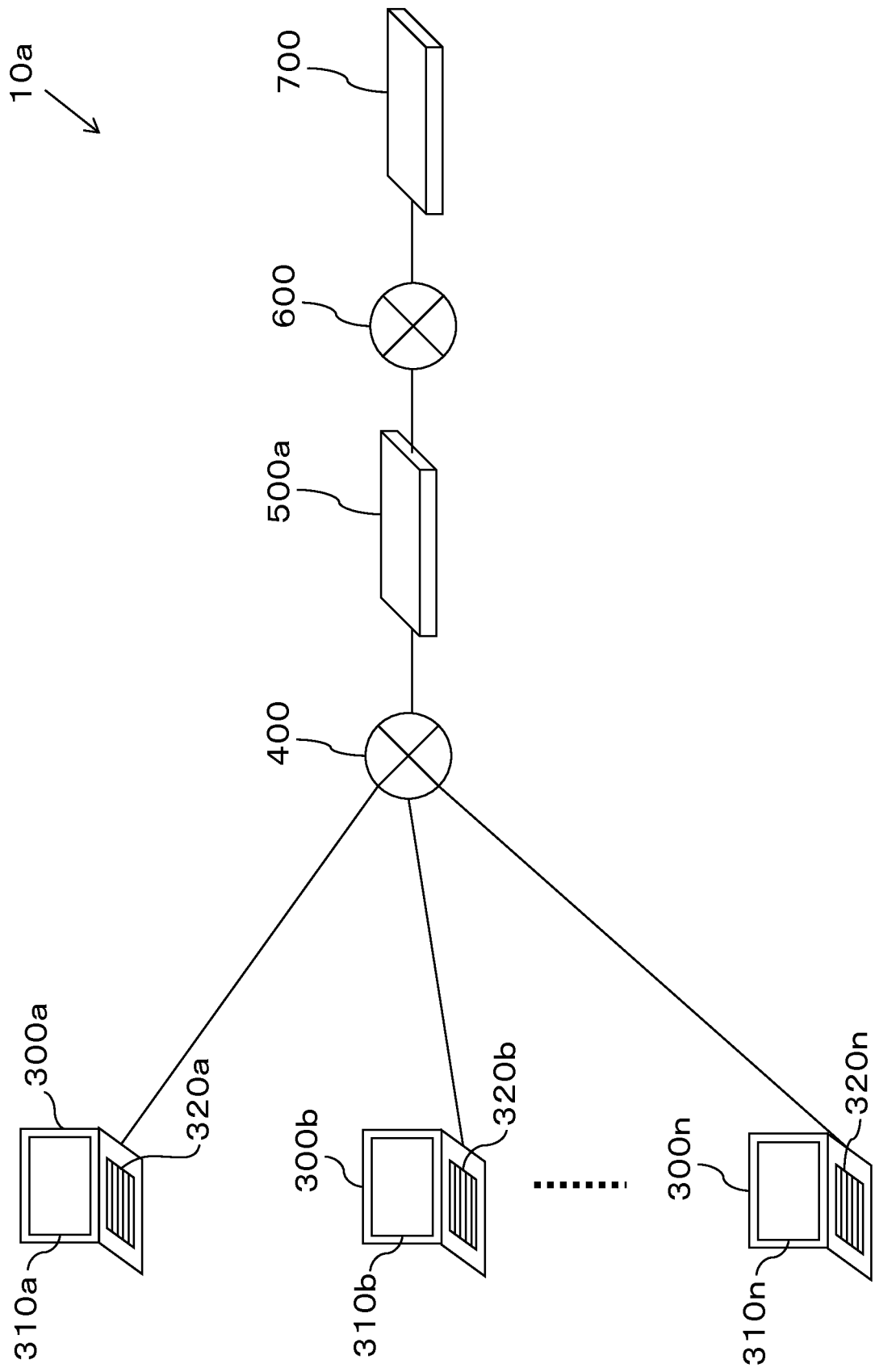
FIG. 1 is a diagram illustrating an example of a relay system.

Hereinafter, with reference to the drawing, a relay system, a relay device, and a control method of a relay device are explained.

First, a first embodiment of a relay system is explained.

1 First Embodiment of Relay System

FIG. 1 is a diagram illustrating an example of a relay system. A relay system 10a illustrated in FIG. 1 has clients 300a to 300n, a relay device 500a, and a file server 700. The relay device 500a and the clients 300a to 300n are connected via an internal network 400. The internal network 400 is, for example, a LAN (Local Area Network).

The relay device 500a and the file server 700 are connected via an external network 600. The external network 600 is, for example, the Internet.

(1) File Server

The file server 700 is a server computer configured to permit access from outside to a file stored in the storage device within the server. It may also be possible for the file server 700 to execute FTP software to perform transmission and reception of a file by making use of the FTP (File Transfer Protocol). In such a case, the file server 700 is specified in the external network 600 using an FTP address, such as "ftp://sss.co.jp". The file stored in the file server 700 is also specified by a file URL (Uniform Resource Locator), which is an FTP address, such as "ftp://sss.co.jp/z.txt". When the file server 700 operates as an FTP server, the file server 700 performs authentication of file acquisition using a user name and a password in response to a request for acquisition of a file from outside and transmits the file in accordance with the authenticated request for acquisition of the file.

The hardware configuration of the file server 700 may be the same as the hardware configuration of the relay device 500a, to be described later using FIG. 2.

(2) Relay Device

The relay device 500a is located at the boundary between the internal network 400 and the external network 600 and makes a connection with the file server 700 of the external network 600 in place of the clients 300a to 300n of the internal network 400.

For example, the relay device 500a uses an IP address masquerade to share a global IP (Internet Protocol) address of the relay device 500a among clients 300 by interconverting the global IP address into the IP address of the client 300a etc. It is possible to access the relay device 500a from the external network 600, therefore the relay device 500a is specified by, for example, an FTP address "ftp://bbb.co.jp".

Upon receipt of a request for acquisition of data of the file server 700 from the client 300a etc., the relay device 500a performs communication control processing to convert the IP address of the client 300a, etc., into the IP address of its own and to transfer the request for acquisition to the file server 700.

It may also be possible for the relay device 500a to permit only specific kinds of connection from the internal network 400 or to perform authentication processing to cut off unauthorized access from the external network 600 by managing access to and from the internal network 400.

For example, the relay device 500a performs the above-described authentication processing by determining whether or not the user name and the password included in the request for acquisition of a file from the client 300a, etc., agree with the user name and the password in an authentication table 930, to be described later.

Further, it is possible for the relay device 500a to perform authentication performed by the file server 700 in advance by making the determination of coincidence described above the same as that of the authentication of file acquisition performed by the file server 700 so as to prevent the request for data acquisition from being rejected by the file server 700. For example, in the case where the file server 700 is an FTP server, the relay device 500a prepares an authentication table, to be described later, so that the authentication processing is the same as that performed by the FTP server and performs authentication of file acquisition in advance using the user name and the password.

Further, the relay device 500a performs history accumulation processing to accumulate a request for acquisition from the client server 300a etc. and data acquired from the file server 700 by the request for acquisition as a history table, to be described later.

The relay device 500a further performs change notification processing including: detection processing to detect whether or not the contents of data are changed by referring to a history table 940 in the case where data acquired by a client is acquired by another client; and notification processing to notify the client having acquired the data first that the contents of the data are changed in the case where the contents of the data are changed. In the case where the performance of detection processing makes clear that the contents of the data are not changed, the relay device 500a does not give any notification to the client having acquired the data first.

Details of the authentication processing, the communication control processing, the history accumulation processing, and the change notification processing described above will be described later using, for example, FIG. 8. The hardware configuration of the relay device 500a and the file server 700 will be described later using FIG. 2.

(3) Client

The clients 300a to 300b are client computers connected to the internal network 400 and configured to acquire data stored in the file server 700. The clients 300a to 300b transmit a request for acquisition of a file stored in the file server 700 to the relay device 500 via the internal network 400, the relay device 500a, and the external network 600.

The client 300a has a CPU (Central Processing Unit), a main memory, and an NIC (Network Interface Card), not illustrated schematically in FIG. 1, and a display 310a and a keyboard 320a illustrated in FIG. 1. The client 300a performs transmission and reception of a file using the FTP by executing FTP client software stored in the main memory. The explanation relating to the client 300a described above is the same for the clients 300b to 300n. The number of the clients 300 illustrated in FIG. 1 is not limited to the number illustrated schematically.

Next, the hardware configuration of the relay device 500a is explained.

2 Hardware Configuration of Relay Device

Figure 2:
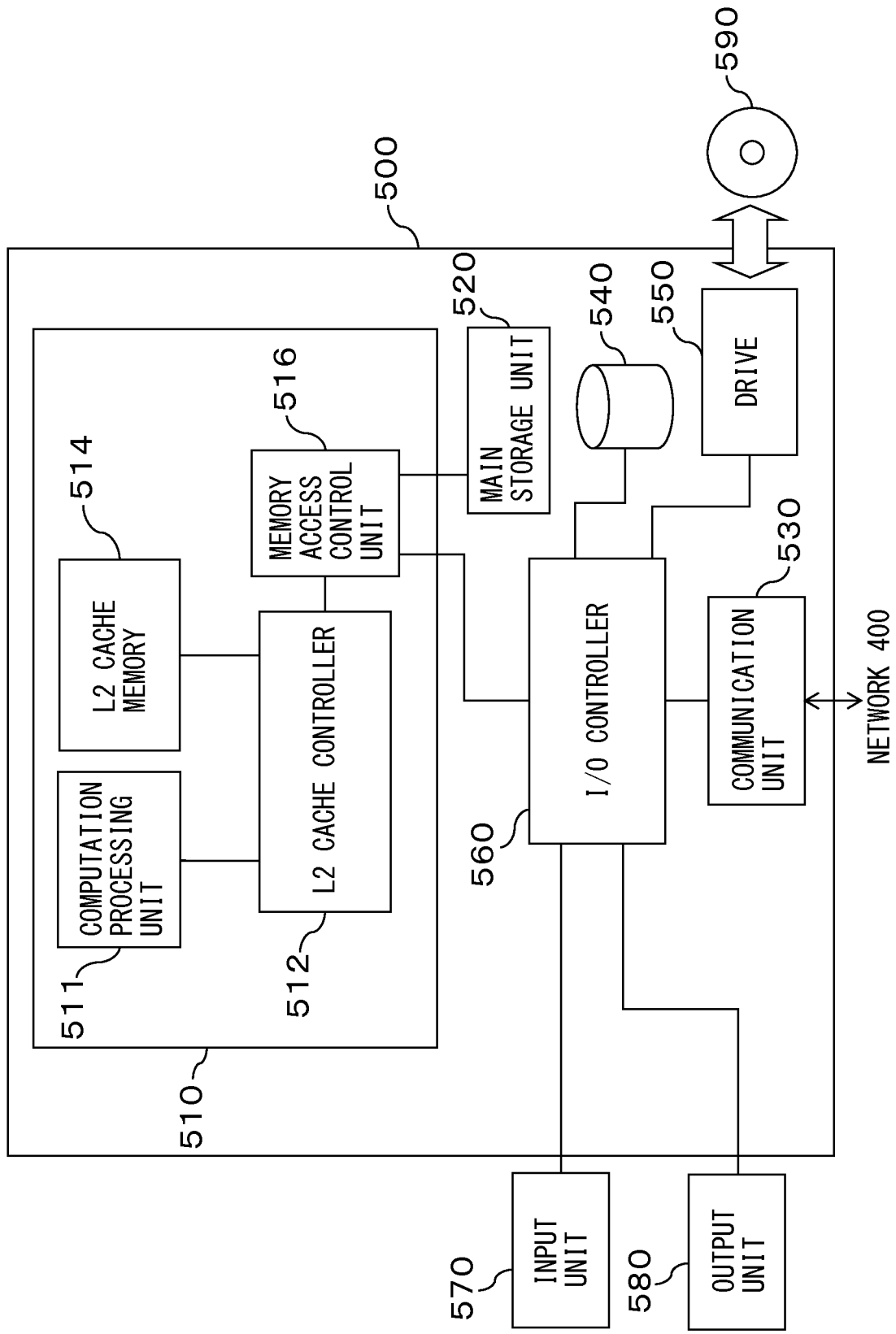
FIG. 2 is a diagram illustrating an example of the hardware configuration of the relay device.

FIG. 2 is a diagram illustrating an example of the hardware configuration of the relay device. As illustrated in FIG. 2, the relay device 500a has a computation processing device 510, a main storage device 520, a communication unit 530, a secondary storage device 540, a drive 550, and an I/O controller 560.

The computation processing device 510 has a computation processing unit 511, an L2 (Level 2: secondary) cache controller 512, an L2 cache memory 514, and a memory access control unit 516. Further, the computation processing device 510 connects with the communication unit 530, the secondary storage device 540, and the drive 550 via the I/O controller 560.

2.1 Computation Processing Device

The computation processing device 510 loads data from the main storage device 520, computes the loaded data, and stores the computation result in the main storage device 520 by executing a program stored in the main storage device 520. The computation processing device 510 is, for example, a CPU.

The memory access control unit 516 is a unit configured to load data from the main storage device 520 to the L2 cache memory 514, to store data received from the L2 cache controller 512 into the main storage device 520, etc.

The L2 cache memory 514 holds part of data stored in the main storage device 520. The L2 cache memory 514 includes data held by an L1 cache memory (not illustrated schematically) that the computation processing unit 511 has.

The L2 cache controller 512 operates so as to store data that is accessed frequently from the computation processing unit 511 in the L2 cache memory and to send data that is accessed less frequently from the cache memory to the main storage device 520.

2.2 I/O Controller

The I/O controller 560 is a device configured to control connections between the computation processing device 510 and other devices to be connected. The I/O controller 560 operates in conformity with the standard, for example, such as the AGP (Accelerated Graphics Port) or the PCI Express (Peripheral Component Interconnect Express).

2.3 Main Storage Device

The main storage device 520 is a device configured to store data and programs. It is possible for the computation processing device 510 to access the main storage device 520 without the I/O controller 560 as a medium. The main storage device 520 is, for example, a DRAM (Dynamic Random Access Memory). An example of a memory map of the main storage device 520 is described later using FIG. 3.

2.4 Secondary Storage Device

The secondary storage device 540 is a device capable of holding information without the supply of power source and configured to store programs and data stored in the main storage device 520. The secondary storage device 540 is a disk array using magnetic disks, an SSD (Solid State Drive) using a flash memory, etc.

2.5 Communication Unit

The communication unit 530 is a device configured to connect with the internal network 400 as a communication path and to perform transmission and reception of data with another information processing device connected to the internal network 400. The communication unit 530 is, for example, an NIC (Network Interface Controller).

2.6 Drive

The drive 550 is a device configured to read from and write to a storage medium 590, such as a floppy (registered trademark) disc, a CD-ROM (Compact Disc Read Only Memory), and a DVD (Digital Versatile Disc). The drive 550 includes a motor configured to cause the storage medium 59 to rotate, a head to read and write data on the storage medium 590, etc. It is possible for the storage medium 590 to store programs. The drive 550 reads programs etc. from the storage medium 590 set in the drive 550. The computation processing device 510 stores programs read by the drive 550 in the main storage device 520 or the secondary storage device 540. Programs or data stored in the storage medium 590 is, for example, programs or data, to be described later using FIG. 3.

An input unit 570 is a device configured to output an input signal to the computation processing device 510, and for example, a keyboard or a mouse. An output unit 580 is a device configured to display an output signal output from the computation processing device 510, and for example, a display.

3 Main Storage Device

Figure 3:
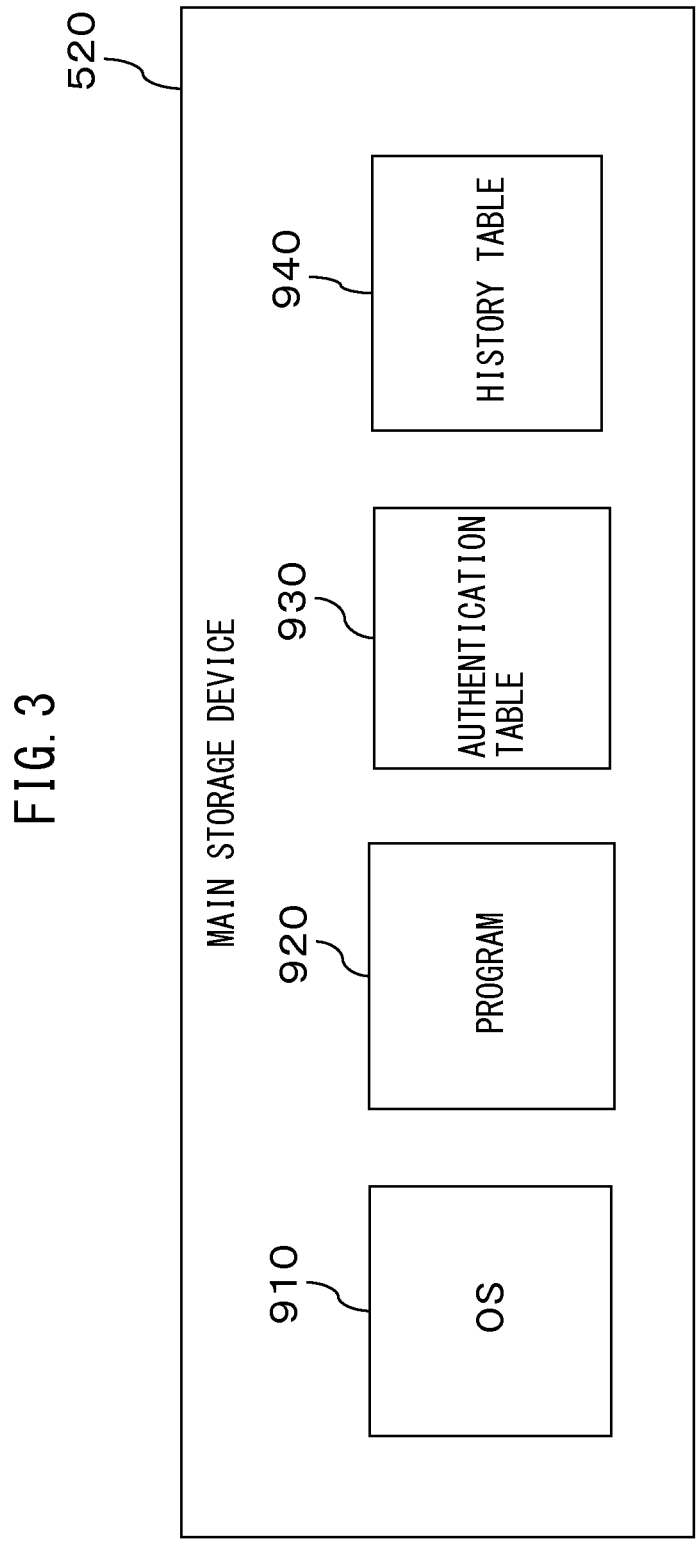
FIG. 3 is a diagram illustrating an example of a memory map of the main storage device of the relay device.

FIG. 3 is a diagram illustrating an example of a memory map of the main storage device of the relay device. The main storage device 520 stores an OS (Operating System) 910, a program 920, the authentication table 930, and the history table 940.

The OS 910 is software configured to provide basic functions to be made use of by a number of applications in a sharing manner, such as the input function to input through a keyboard and the output function to output on a screen, and the function to manage a disk and a memory, and to manage the whole of the hardware resources. The OS 910 is, for example, Microsoft Windows (registered trademark) Server (registered trademark).

The program 920 is a program configured to cause the relay device 500a to perform information processing, such as authentication processing, communication control processing, history accumulation processing, and change notification processing.

The authentication table 930 is a table indicating a correspondence relationship between a user ID (IDentifier) of a user who makes use of a client, a password, and a mail address. A detailed example of the authentication table 930 will be descried later using FIG. 5.

The history table 940 is a table indicating a correspondence relationship between a mail address of a user, a file name acquired by a client, and a VL (Version Level). A detailed example of the history table 940 will be descried later using FIG. 6.

Figures 4, 5:
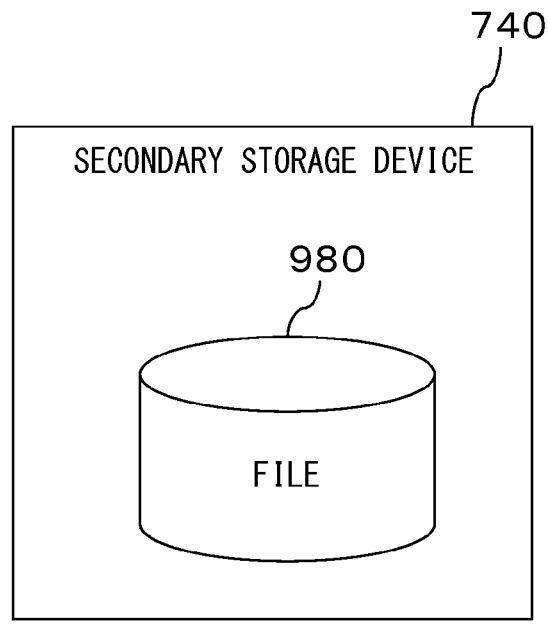
FIG. 4 is a diagram illustrating an example of a secondary storage device of the file server.
FIG. 5 is a diagram illustrating an example of an authentication table.

FIG. 4 is a diagram illustrating an example of a secondary storage device of the file server. A secondary storage device 740 of the file server 700 stores a file 980.

The file 980 is specified by an arbitrary address. For example, in the case where the file server 700 is an FTP server, the file 980 is specified by an FTP address.

FIG. 5 is a diagram illustrating an example of an authentication table. The authentication table 930 illustrated in FIG. 5 is a table to which the relay device 500a refers at the time of authentication processing. The authentication table 930 has a user ID column 931, a password column 932, and a mail address column 933 and in the columns, user IDs, passwords, and mail addresses of users who make use of a client are input, respectively. The user ID, the password, and the mail address in the same entry (row) of the authentication table 930 are the ID, the password, and the mail address of a certain user and are associated with one another as information of the user.

Upon receipt of a request for acquisition of a file specified by an FTP address from a client, the relay device 500a determines whether or not the user ID and the password included in the received request for acquisition correspond to an entry of the authentication table 930. In the case where the user ID and the password correspond to any of the entries of the authentication table 930, the relay device 500a downloads a file from the file server 700 specified by the FTP address in place of the client.

In an entry 934 illustrated in FIG. 5, a user ID "aaa", a password "ghi-1234", and a mail address "xxxx@fujitsu.com" are input. In an entry 935, a user ID "bbb", a password "def-3456", and a mail address "yyyy@fujitsu.com" are input. In an entry 936, a user ID "ccc", a password "opq-9876", and a mail address "zzzz@fujitsu.com" are input.

FIG. 6 is a diagram illustrating an example of a history table. The history table 940 illustrated in FIG. 6 is a table to which a history of information of a file downloaded by a client is input. The history table 940 has a mail address column 941, a file name column 942, and a VL column 943 and in the columns, mail addresses of users who have downloaded files, file names of the downloaded files, and the VLs of the files are input, respectively. The mail address, the file name, and the VL in the same entry of the history table 940 are those extracted from an access history from a certain client to the file server and input, and are associated with one another as history information of certain access.

The file name is a unique file name and by the file name, the position of the file in the file server 700 is specified. Although not illustrated in the history table in FIG. 6, the history table may have a file URL in the entry. The VL is a revision history of a file. The number of the VL indicative of revision increases each time revision is performed, and therefore, it is indicated that the larger the VL, the more recent the revision is performed.

In the following explanation, the "file name" and the "VL" are called "property information" of a file.

Upon acquisition of a file from the file server 700 specified by an FTP address, the relay device 500a inputs the mail address corresponding to the user ID and the password at the time of authentication in the authentication table, and the "file name" and the "VL" of the acquired file in the same entry of the history table 940.

Next, information processing performed by the relay device 500a is explained.

4 Information Processing of Relay Device

Figure 7:
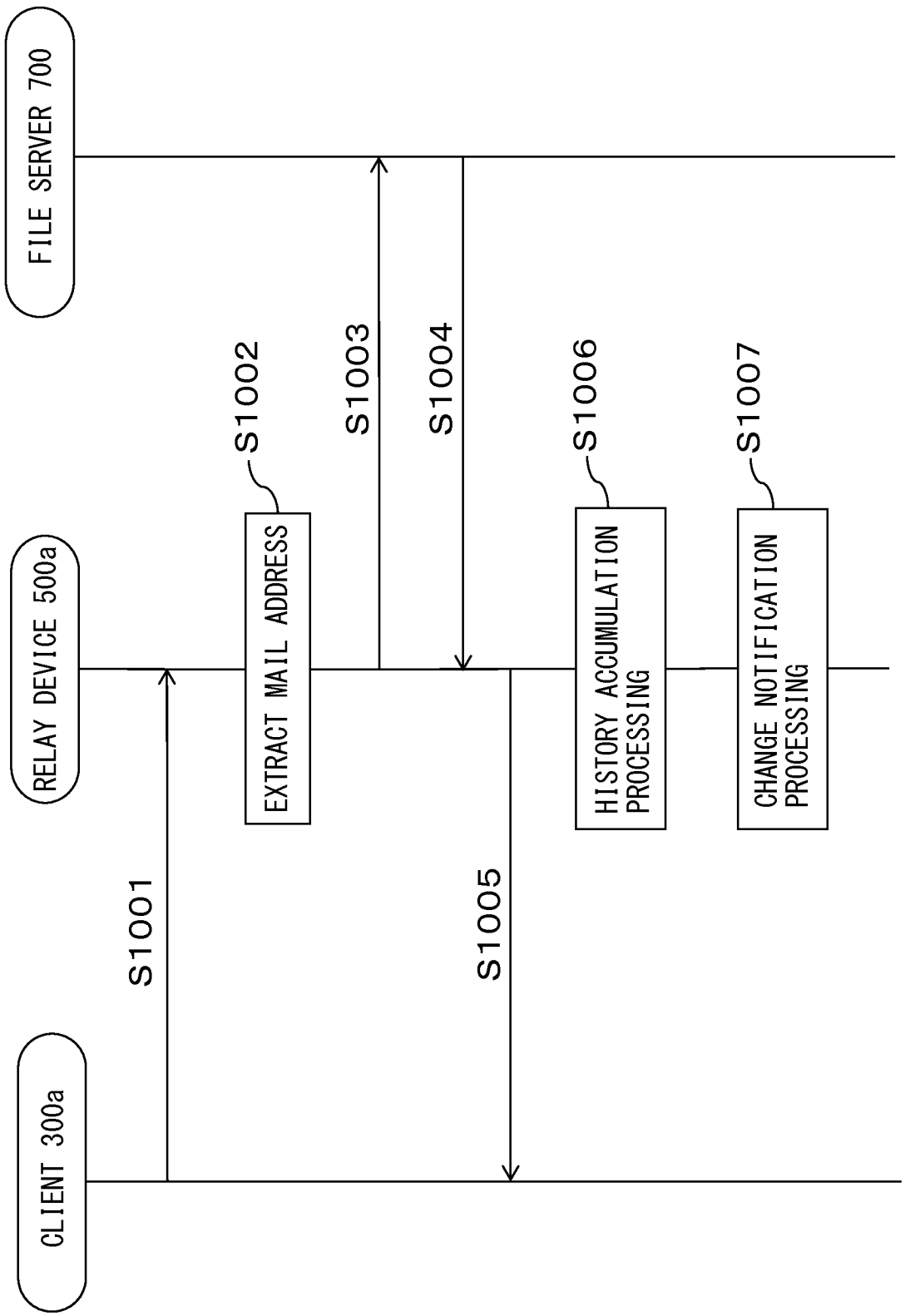
FIG. 7 is a sequence diagram illustrating an example of information processing of a relay device.

FIG. 7 is a sequence diagram illustrating an example of information processing of a relay device. Using FIG. 7, information processing of a relay device when acquiring a file whose history is not included in the history table is explained below.

(1) Acquisition of File Whose History is Not Included in History Table

Processing of the client 300a to acquire a file whose history is not included in the history table 940 from the file server 700 is explained. The client 300a transmits a request for acquisition of a file including a user ID, a password, and a file URL to the relay device 500a (S1001).

Upon receipt of the request for acquisition, the relay device 500a authenticates the request for acquisition by checking whether or not the information registered in the authentication table 930 agrees with the information included in the request for acquisition. When authenticating the request for acquisition, the relay device 500a extracts a mail address included in the authentication table 930 (S1002).

For example, in the case where the request for acquisition includes the user ID "aaa" and the password "ghi-1234", the relay device 500a performs authentication by checking whether or not there is an entry including the user ID and the password described above in the authentication table 930. In the case where the user ID and the password included in the request for acquisition are included in the authentication table 930, the relay device 500a extracts the mail address in the entry including the user ID and the password described above from the authentication table 930. For example, the entry including the user ID "aaa" and the password "ghi-1234" in the authentication table 930 is the entry 934 in FIG. 5, and therefore, the mail address to be extracted is "xxxx@fujitsu.com".

After extracting the mail address, the relay device 500a transmits the request for acquisition to the file server 700 (S1003). For example, the file to be acquired is a file specified by a file URL "ftp://sss.co.jp/z.txt" included in the request for acquisition.

When authenticating the user ID and the password included in the request for acquisition, the file server 700 transmits the file to be acquired to the relay device 500a (S1004).

The relay device 500a transmits the file received from the file server 700 to the client 300a (S1005).

The relay device 500a extracts property information ("file name" and "VL") of the file downloaded from the file server 700. Then, the relay device 500a registers the property information extracted from the downloaded file and the mail address extracted at S1002 in the history table 940 as one entry as history accumulation processing (S1006).

For example, the entry in the history table 940 registered at S1006 is an entry 944 illustrated in FIG. 6.

The relay device 500a reads the history table 940 and searches for an entry whose file name agrees with the file name of the property information extracted at S1006 and which is older than the entry registered at S1006 as change notification processing (S1007). The change notification processing includes detection processing to detect whether or not the contents of data are changed by referring to the history table 940 in the case where the data acquired by a client is acquired by another client, and notification processing to notify the client having acquired the data first that the contents of the data are changed in the case where the contents of the data are changed. This example illustrates download of a file whose history is not included in the history table 940, and therefore, after the detection processing, the relay device 500a exits the change notification processing without performing the notification processing to notify another client of the most recent version of the downloaded file.

(2) Acquisition of File Whose History is Included in History Table

Figure 8:
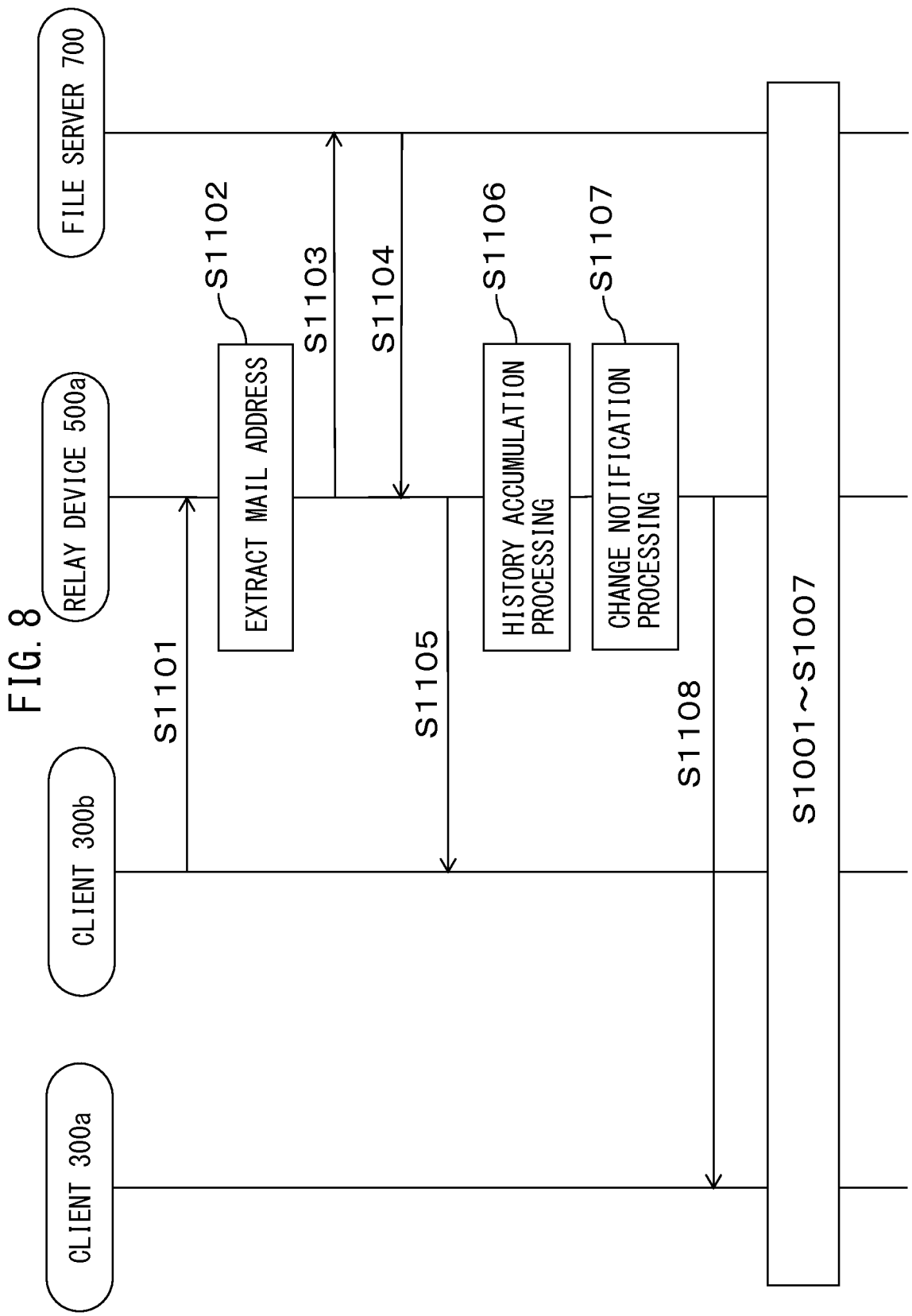
FIG. 8 is a sequence diagram illustrating an example of information processing of the relay device.

FIG. 8 is a sequence diagram illustrating an example of information processing of the relay device. Using FIG. 8, information processing of the relay device when acquiring a file whose history is included in the history table is explained below.

The client 300b transmits a request for acquisition of a file including a user ID, a password, and a file URL to the relay device 500a (S1101).

Upon receipt of the request for acquisition from the client 300b, the relay device 500a authenticates the request for acquisition by checking whether or not the information registered in the authentication table 930 agrees with the information included in the received request for acquisition. When authenticating the request for acquisition, the relay device 500a extracts a mail address included in the authentication table 930 (S1102).

For example, in the case where the request for acquisition includes the user ID "bbb" and the password "def-3456", the relay device 500a performs authentication by checking whether or not there is an entry including the user ID and the password described above in the authentication table 930. Then, when authenticating the request for acquisition, the relay device 500a extracts the mail address in the entry including the user ID and the password described above in the authentication table 930. For example, the entry including the user ID "bbb" and the password "def-3456" in the authentication table 930 is the entry 935 in FIG. 5, and therefore, the mail address to be extracted is "yyy@fujitsu.com".

The relay device 500a transmits the request for acquisition received from the client 300b to the file server 700 (S1103). For example, the file to be acquired is a file specified by the file URL "ftp://sss.co.jp/z.txt" included in the request for acquisition.

When authenticating the user ID and the password included in the request for acquisition, the file server 700 transmits the file to be acquired to the relay device 500a (S1104).

The relay device 500a transmits the file received from the file server 700 to the client 300a (S1105).

The relay device 500a extracts property information ("file name" and "VL") of the file downloaded from the file server 700. Then, the relay device 500a registers the property information extracted from the downloaded file and the mail address extracted at S1102 in the history table 940 as one entry as history accumulation processing (S1106).

For example, the entry in the history table 940 registered at S1106 is an entry 945 illustrated in FIG. 6.

The relay device 500a reads the history table 940 and searches for an entry whose file name agrees with the file name of the property information extracted at S1106 and which is older than the entry registered at S1106 (S1107) as change notification processing. The relay device 500a searches for an older entry by comparing the VL of the file whose entry is registered in the history table 940 at S1106 and the VL associated with the same file name as that of the file whose entry is registered at S1106. The VL of the file registered at S1006 is "V20L10" and the VL of the file registered at S1106 is "V21L10". Consequently, in the example in FIG. 8, there is an older entry in the history table 940, and therefore, the relay device 500a distributes file update information by a mail to the client 300a having acquired the file at S1005 and whose extracted mail address is (xxxx@fujitsu.com) (S1108). File update information is, for example, the file URL (ftp://sss.co.jp/z.txt) of the most recent VL file.

Upon receipt of the file update information from the relay device 500a, the client 300a performs the same processing as that at S1001 to S1007 in FIG. 7 on the file with the most recent VL. In the update detection processing (S1007) of the most recent VL (V21L10), the file with the VL "V21L10" acquired by the client 300a is the most recent, and therefore, the file update information at 1108 is not notified to the other client 300b registered in the history table 940.

In the above, whether or not the file is updated is determined using the file name and the VL, however, the determination is not limited to this example. It may also be possible for the relay device to determine whether or not the file is updated by using the update time of the file in place of the VL and comparing the file update times.

As described above, it is possible for the relay device 500a to avoid inconsistency in files in a plurality of clients by notifying the client having acquired the file before update of the update of the file in the file server. This notification processing does not require any function on the file server side and is performed by the relay device 500a.

Further, by the relay device 500a performing the same authentication as that of the file server 700, it is possible to obviate unnecessary processing to transmit a request for acquisition of a file, which is not acquired by the file server 700, to the file server 700.

Furthermore, by the relay device 500a extracting a destination included in the authentication table 930 and transmitting the acquired data to the destination, it is possible to obviate the processing to perform detection processing by providing new table information in relation to the notification destination of the updated data.

5 Second Embodiment of Relay System

Figure 9:
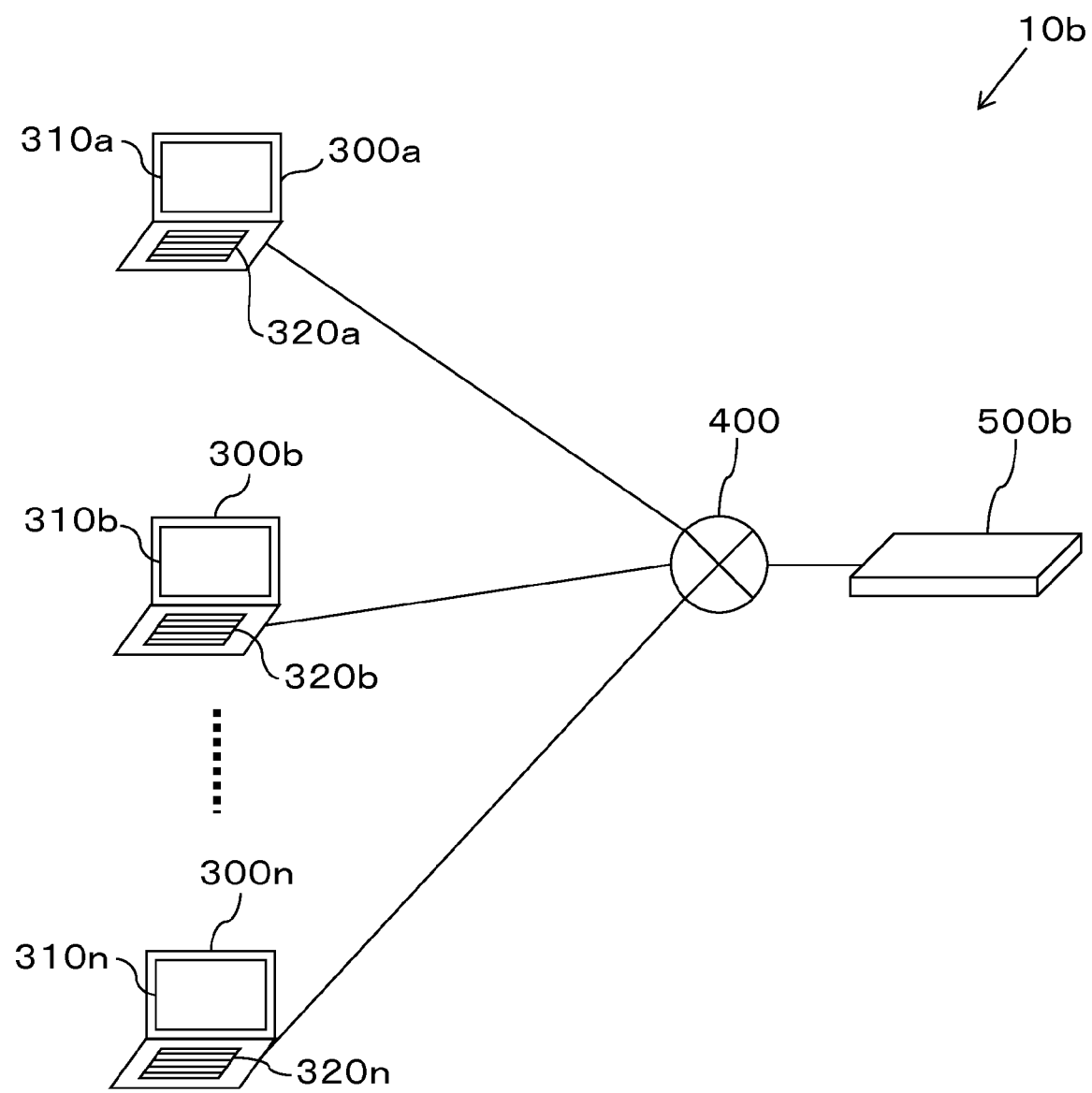
FIG. 9 is a diagram illustrating the second embodiment of a relay system.

Next, a second embodiment of a relay system is explained.
FIG. 9 is a diagram illustrating the second embodiment of a relay system. A relay system 10b illustrated in FIG. 9 has the clients 300a, 300b, . . . , 300n and a relay device 500b. The relay device 500b operates also as the file server 700 by storing the file 980 in the secondary storage device 540, in addition to the function of the relay device 500a. The hardware configuration of the relay device 500b is the same as that of the relay device 500a explained using FIG. 2.

The relay device 500b performs the same processing as the authentication processing of the relay device 500a and also performs authentication processing of file acquisition of the secondary storage device 540 by this processing.

Next, information processing performed by the relay device 500b is explained.

6 Information Processing of Relay Device

Figure 10:
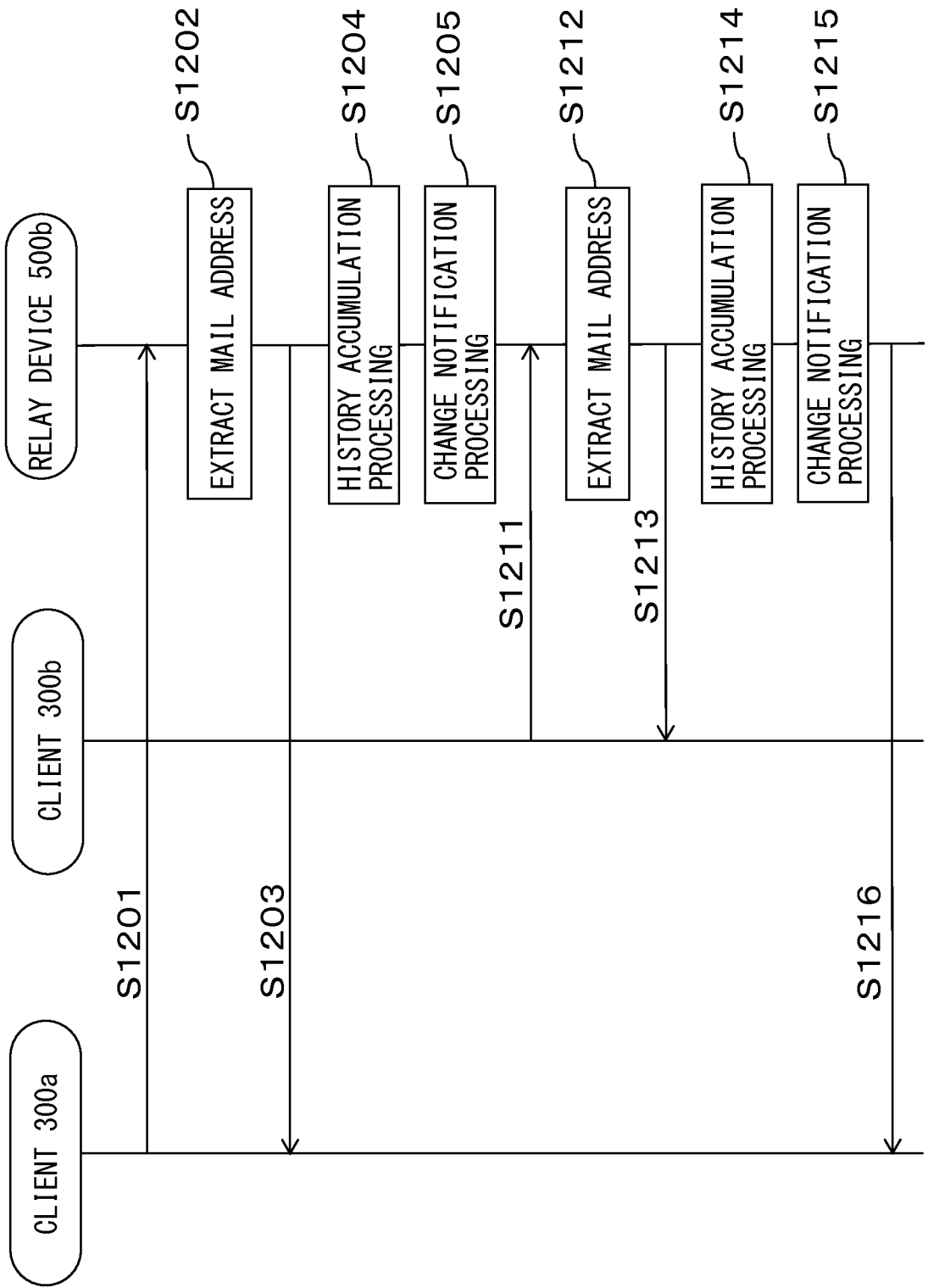
FIG. 10 is a sequence diagram illustrating an example of information processing of the relay device.

FIG. 10 is a sequence diagram illustrating an example of information processing of the relay device.

Processing of the client 300a to acquire a file whose history is not included in the history table 940 from the file server 700 is explained. The client 300a transmits a request for acquisition of a file to the relay device 500b by a user ID and a password (S1201).

Upon receipt of the request for acquisition from the client 300a, the relay device 500b authenticates the request for acquisition by checking whether or not the information registered in the authentication table 930 agrees with the information included in the received request for acquisition. When authenticating the request for acquisition, the relay device 500b extracts a mail address included in the authentication table 930 (S1202).

For example, in the case where the request for acquisition includes the user ID "aaa" and the password "ghi-1234", the relay device 500b performs authentication by checking whether or not there is an entry including the user ID and the password described above in the authentication table 930. Then, the relay device 500b extracts the mail address in the entry including the user ID and the password described above in the authentication table 930. For example, the entry that includes the user ID "aaa" and the password "ghi-1234" in the authentication table 930 is the entry 934 in FIG. 5, and therefore, the mail address to be extracted is "xxxx@fujitsu.com".

The relay device 500b permits acquisition of a file stored in the secondary storage device 540 by the authentication processing, therefore transmits the file to the client 300a (S1203).

The relay device 500b extracts property information of the transmitted file. Then, the relay device 500b registers the extracted property information and the mail address extracted at S1202 in the history table 940 as one entry as history accumulation processing (S1204).

For example, the entry of the history table 940 registered at S1204 is the entry 944 illustrated in FIG. 6.

The relay device 500a reads the history table 940 and searches for an entry whose file name agrees with the file name of the property information extracted at S1204 and which is older than the entry registered at S1204 (S1205). In this example, because download of a file whose history is not included in the history table 940 is illustrated, there is no entry including the same file name in the history table 940, and therefore, the relay device 500b does not perform notification processing.

Next, the client 300b transmits a request for acquisition of a file to the relay device 500b by a user ID and a password (S1211).

Upon receipt of the request for acquisition from the client 300b, the relay device 500b authenticates the request for acquisition by checking whether or not the information registered in the authentication table 930 agrees with the information included in the request for acquisition received from the client 300b. When authenticating the request for acquisition, the relay device 500b extracts a mail address included in the authentication table 930 (S1212).

For example, in the case where the request for acquisition includes the user ID "bbb" and the password "def-3456", the relay device 500b performs authentication by checking whether or not there is an entry including the user ID and the password described above in the authentication table 930. Then, the relay device 500b extracts the mail address in the entry including the user ID and the password described above in the authentication table 930. For example, the entry that includes the user ID "bbb" and the password "def-3456" in the authentication table 930 is the entry 935 in FIG. 5, and therefore, the mail address to be extracted is "yyyy@fujitsu.com".

The relay device 500b permits acquisition of a file stored in the secondary storage device 540 by the authentication processing, therefore transmits the file to the client 300b (S1213).

The relay device 500b extracts property information of the downloaded file. Then, the relay device 500b registers the extracted property information and the mail address extracted at S1212 in the history table 940 as one entry as history accumulation processing (S1214).

For example, the entry of the history table 940 registered at S1214 is the entry 945 illustrated in FIG. 6.

The relay device 500a reads the history table 940 and searches for an entry whose file name agrees with the file name of the property information extracted at S1204 and which is older than the entry registered at S1214 (S1215). The relay device 500b searches for an older entry with the same file name by comparing the VLs in the history table. The VL of the file whose file name is "software AA" registered at S1214 is "V20L10" and the VL of the file whose file name is "software AA" registered at S1204 is "V21L10". Consequently, there is an older file of "software AA", and therefore, the relay device 500b distributes file update information by a mail to the client 300a having acquired the file at S1203 and whose extracted mail address is (xxxx@fujitsu.com) (S1216). File update information is, for example, the file URL (ftp://sss.co.jp/z.txt) of the most recent VL file.

As described above, the relay device 500b comprises the function of a file server.

7 Third Embodiment of Relay System

Next, a third embodiment of a relay system is explained.

Figure 11:
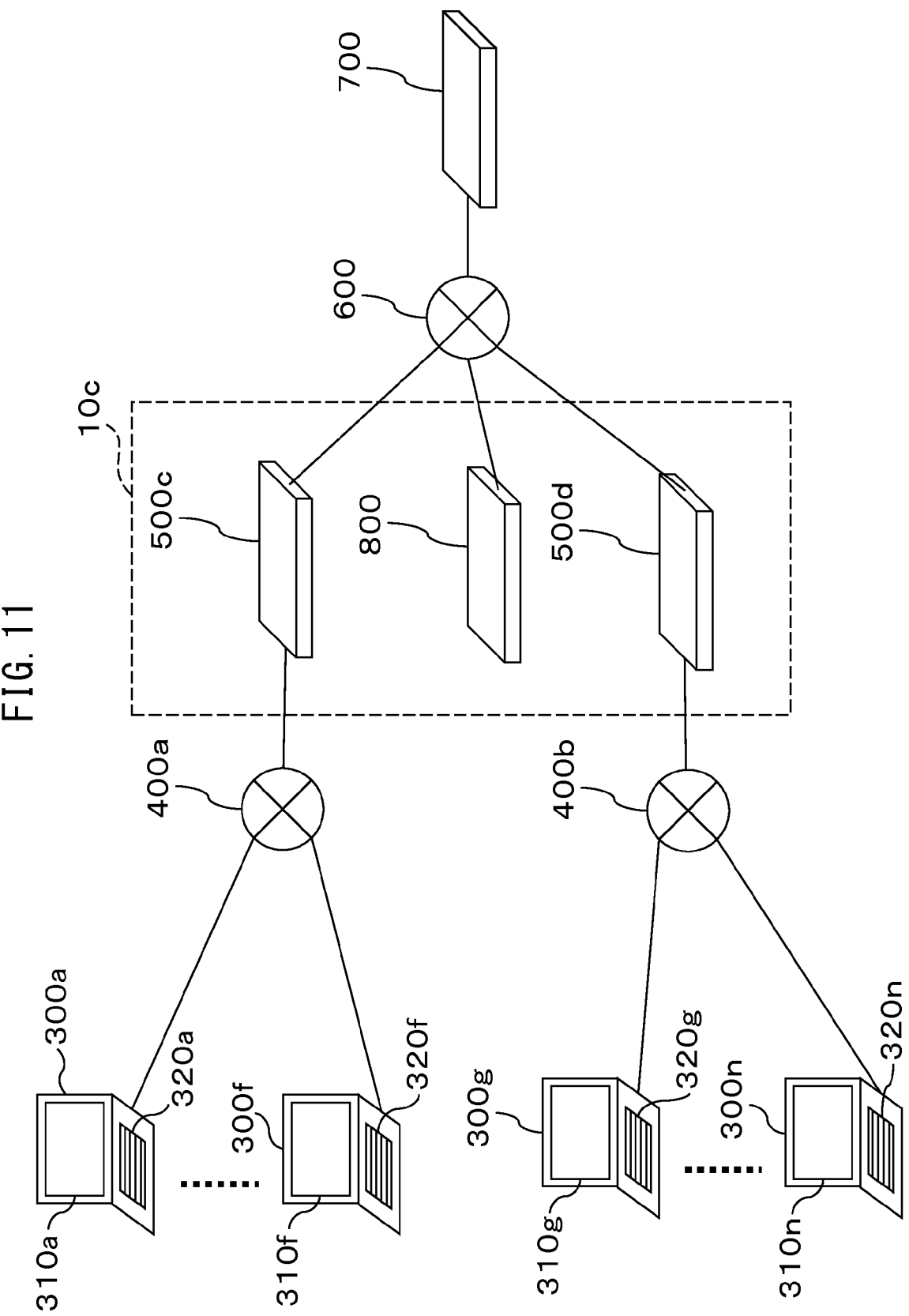
FIG. 11 is a diagram illustrating the third embodiment of a relay system.

FIG. 11 is a diagram illustrating the third embodiment of a relay system. A relay system 10c illustrated in FIG. 11 has relay devices 500c and 500d and a management device 800.

The relay devices 500c and 500d and the management device 800 have, for example, the same hardware configuration of the relay device 500a explained in FIG. 2.

The relay device 500c connects with the clients 300a to 300f via an internal network 400a. The relay device 500c connects with the file server 700 via the external network 600. The relay device 500d connects with the clients 300g to 300n via an internal network 400b. The relay device 500d connects with the file server 700 via the external network 600.

The relay devices 500c and 500d perform the authentication processing, the communication control processing, the history accumulation processing, and the change notification processing already explained above. However, in the history accumulation processing, when acquiring data from the file server 700, the relay devices 500c and 500d transmit property information obtained at the time of data acquisition to the management device 800. The management device 800 performs processing to refer to a relay device management table (to be described later in FIG. 12) in the main storage device of its own and to transfer the property information to another relay device. It may also be possible for the relay devices 500c and 500d and the management device 800 to transfer the file URL in addition to the property information.

The relay device having received the property information performs the history accumulation processing and the change notification processing using the received information.

Figure 12:
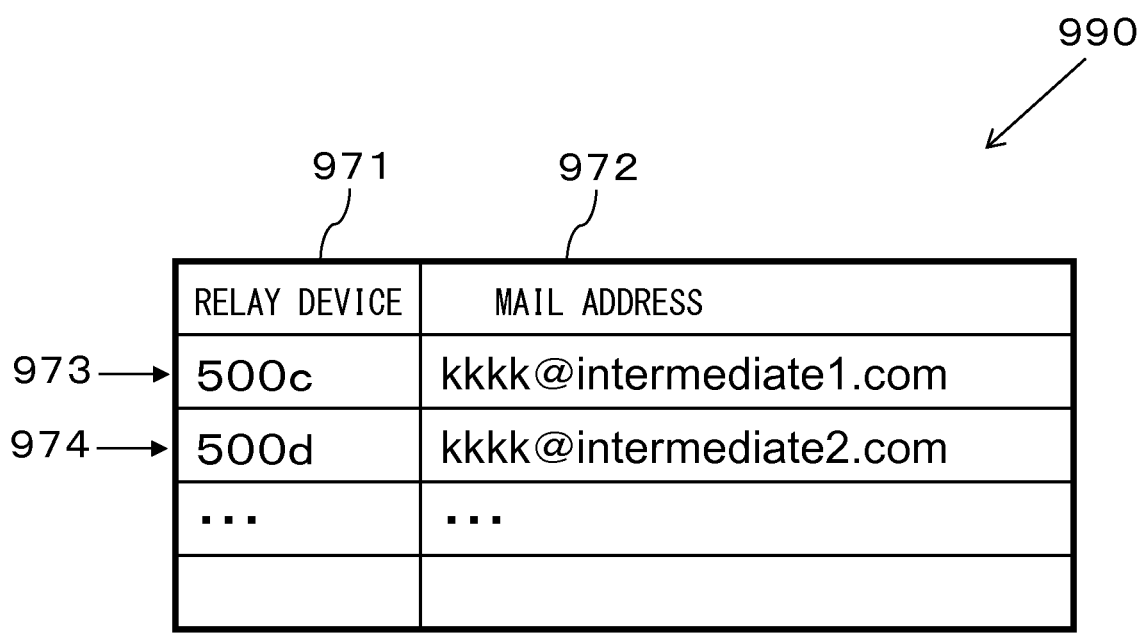
FIG. 12 is a diagram illustrating an example of a relay device management table.

FIG. 12 is a diagram illustrating an example of a relay device management table. A relay device management table 990 has a relay device column 971 and a mail address column 972 and in the columns, names of relay devices and mail addresses of relay devices are input, respectively. The relay device in the entry (row) of the relay device management table 990 is specified by the mail address in the same entry. Upon receipt of property information from a relay device, the management device 800 transmits property information to another relay device registered in the relay device management table 990 different from the relay device having performed the transmission. The relay devices registered in the relay device management table 990 are relay devices registered in different internal networks, respectively.

The management device 800 synchronizes a history table of a relay device and a history table of another relay device by referring to the relay device management table 990 and transferring property information and a file URL transmitted from the relay device to the other relay device connected to a different internal network. Then, the file URL is transferred to a client connected to the internal network of the other relay device, thereby it is possible for the client to know that the file with the same name updated in a different internal network is updated. In this manner, it is possible for each relay device to notify a file update to a client in the internal network to which the relay device is connected by a file acquired by a client connected to an internal network to which the relay device is not connected. Consequently, it is made possible for the relay system 10c to perform file update notification in a large scale system having a plurality of internal networks.

8 Information Processing of Relay Device

Figure 13:
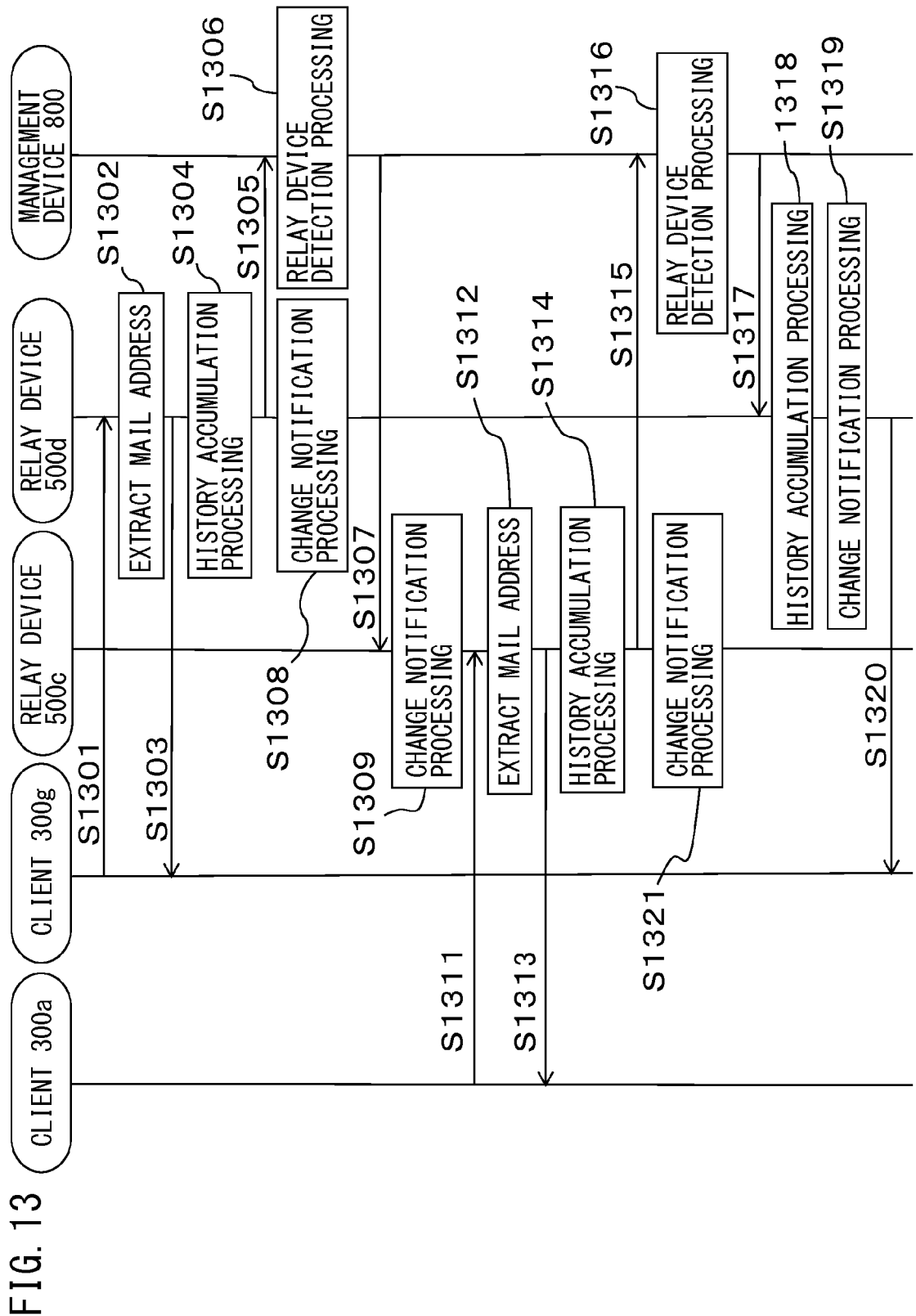
FIG. 13 is a sequence diagram illustrating an example of information processing of a relay device.

FIG. 13 is a sequence diagram illustrating an example of information processing of a relay device. Although processing to acquire a file from the file server 700 is omitted in FIG. 13, the relay device 500c or 500d acquires a file for which a request for acquisition has been made from the file server 700 after performing processing to extract a mail address (S1302 or S1312) in response to the request for acquisition of a file from the client 300a or 300g.

First, processing of the client 300g to acquire a file whose history is not included in the history table 940 of the relay device 500d to which the client 300g is connected from the file server 700 is explained. In the history table 940 of the relay device 500c also, the history of the file that the client 300g acquires from the file server 700 is not included. The client 300g transmits a request for acquisition of a file to the relay device 500d by a user ID and a password (S1301).

Upon receipt of the request for acquisition from the client 300g, the relay device 500d authenticates the request for acquisition by checking whether or not the information registered in the authentication table 930 agrees with the information included in the request for acquisition from the client 300g. When authenticating the request for acquisition, the relay device 500d extracts a mail address included in the authentication table 930 (S1302).

For example, in the case where the request for acquisition includes the user ID "aaa" and the password "ghi-1234", the relay device 500d performs authentication by checking whether or not there is an entry including the user ID and the password described above in the authentication table 930. Then, the relay device 500d extracts the mail address in the entry including the user ID and the password described above. For example, the entry that includes the user ID "aaa" and the password "ghi-1234" is the entry 934 in FIG. 5, and therefore, the mail address to be extracted is "xxxx@fujitsu.com".

The relay device 500d permits acquisition of a file stored in the file server 700 by the above-mentioned authentication processing, therefore transmits the file to the client 300g (S1303).

The relay device 500d extracts property information of the transmitted file. Then, the relay device 500d registers the property information extracted from the file and the mail address extracted at S1302 in the history table 940 as one entry as history accumulation processing (S1304).

For example, the entry of the history table 940 registered at S1304 is the entry 944 illustrated in FIG. 6.

Further, the relay device 500d transmits a file URL together with the property information extracted from the file to the management device 800 (S1305). Upon receipt of the property information and the file URL from the relay device 500d, the management device 800 performs relay device detection processing to detect the relay device 500c different from the relay device 500d having performed transmission by referring to the relay device management table 990 (S1306). The management device 800 transmits the property information and the file URL to the relay device 500c (S1307).

The relay device 500c synchronizes the history table of the relay device 500d and the history table of its own by updating the history table of its own with the most recent version VL based on the received property information.

The relay device 500d reads the history table 940 and searches for an entry whose file name agrees with the file name of the property information extracted at S1304 and which is older than the entry registered at S1304 (S1308). In this example, because download of a file whose history is not included in the history table 940 is illustrated, there is no entry including the same file name in the history table 940, and therefore, the relay device 500d does not perform notification processing.

In the example in FIG. 13, the property information transmitted at S1307 is not included in the history table 940 of the relay device 500c, and therefore, the relay device 500c exits the change notification processing without performing the notification processing (S1309).

Independently of the operation of the client 300g, the client 300a transmits a request for acquisition of a file to the relay device 500c (S1311). The relay device 500c extracts a mail address (S1312) and transmits the file acquired from the file server 700, for which the request for acquisition has been made, to the client 300a (S1313). The relay device 500c registers the property information extracted from the file and the mail address extracted at S1312 in the history table 940 as one entry as history accumulation processing (S1314).

Next, the relay device 500c reads the history table 940 and searches for an entry whose file name agrees with the file name of the property information extracted at S1313 and which is older than the entry already registered as change notification processing (S1321). In the case where the file transmitted to the client 300a at S1313 corresponds to a file whose history is not included in the history table 940, the relay device 500c exits the change notification processing without performing notification processing to notify another client having downloaded the file of the most recent version of the file.

The relay device 500c transmits the property information extracted from the file downloaded from the file server to the management device 800 (S1315). Upon receipt of the property information from the relay device 500c, the management device 800 detects the relay device 500d different from the relay device 500c having performed transmission by referring to the relay device management table 990 (S1316). The management device 800 transmits the property information to the relay device 500d (S1317).

The relay device 500d reads the history table 940 and searches for an entry whose file name agrees with the file name of the property information received at S1315 and which is older than the entry that is registered. The relay device 500d searches for an older entry by comparing the VLs (S1319). For example, the VL of the file registered at S1304 is "V20L10" and the VL of the property information transmitted at S1317 is "V21L10". Consequently, there is an older entry, and therefore, the relay device 500d distributes file update information by a mail to the client 300g having acquired the file at S1303 and having the extracted mail address (S1320). File update information is, for example, the file URL of the most recent VL file (ftp://sss.co.jp/z.txt).

Although not illustrated in FIG. 13, by the client 300g making a request for acquisition of the file notified at S1320, the relay device 500d performs the history accumulation processing using the property information extracted from the file and the fact that the client 300g has acquired the most recent version file is accumulated in the history table 940.

Although not illustrated in FIG. 13, the relay device 500d further transmits the property information extracted from the file and the file URL to the management device 800 and the management device 800 performs relay device detection processing, thereby the relay device 500c updates the history table 940 using the property information transmitted from the relay device 500d via the management device 800 and the fact that the client 300g has acquired the most recent version file is accumulated.

9 Fourth Embodiment of Relay System

Next, a fourth embodiment of a relay system is explained.

Figure 14:
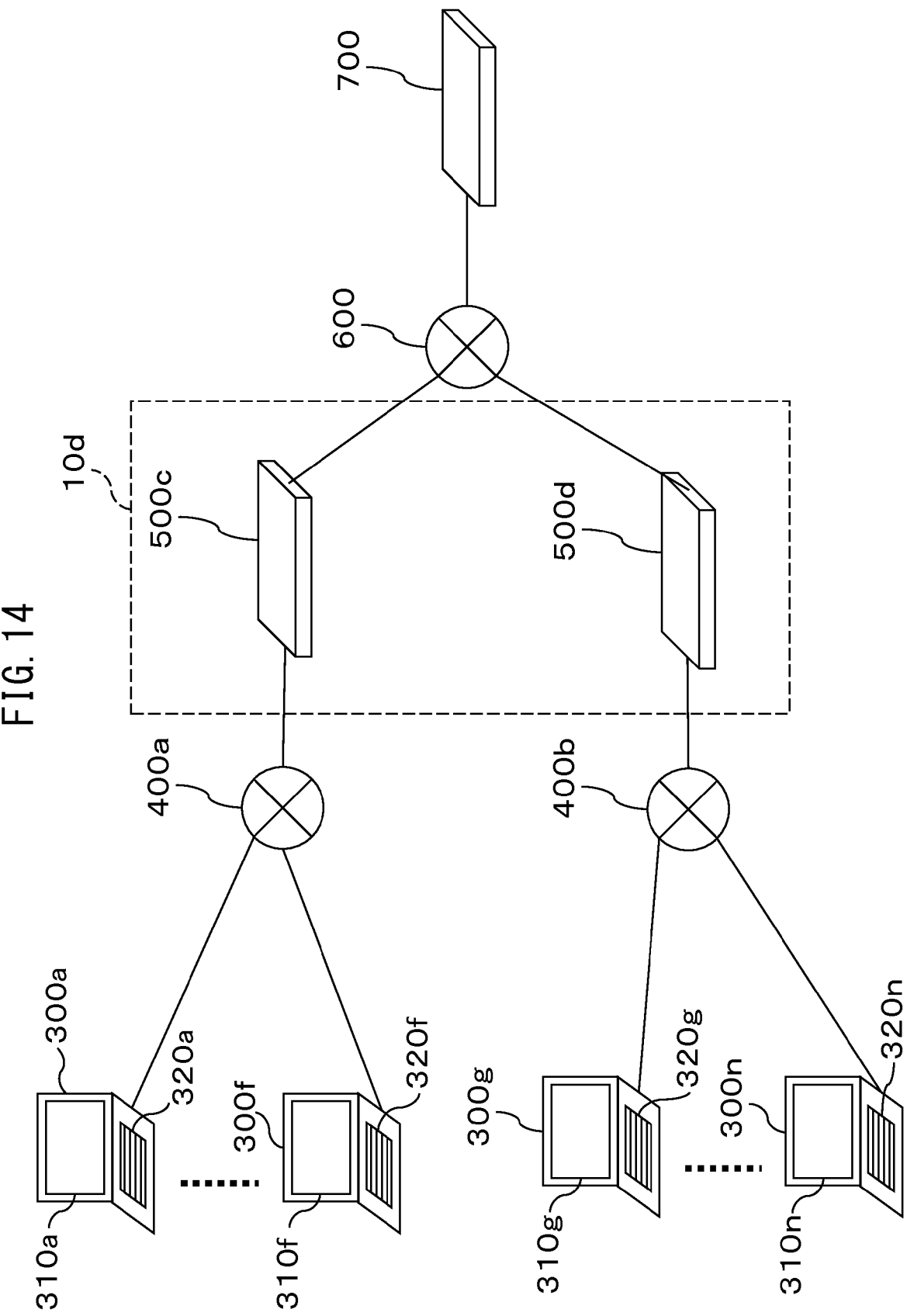
FIG. 14 is a diagram illustrating the fourth embodiment of a relay system.

FIG. 14 is a diagram illustrating the fourth embodiment of a relay system. A relay system 10d illustrated in FIG. 14 has the relay devices 500c and 500d. The relay devices 500c and 500d connect with the clients 300a to 300f via the internal network 400a or with the clients 300g to 300n via the internal network 400b. The relay devices 500c and 500d connect with the file server 700 via the external network 600. The relay system 10d illustrated in FIG. 14 does not have the management device 800 illustrated in FIG. 11. Instead, the relay devices 500c and 500d have a relay device management table and when history accumulation processing is performed, the relay devices 500c and 500d notify the change of the file by transmitting property information to another relay device by referring to the relay device management table.

10 Information Processing of Relay Device

Figure 15:
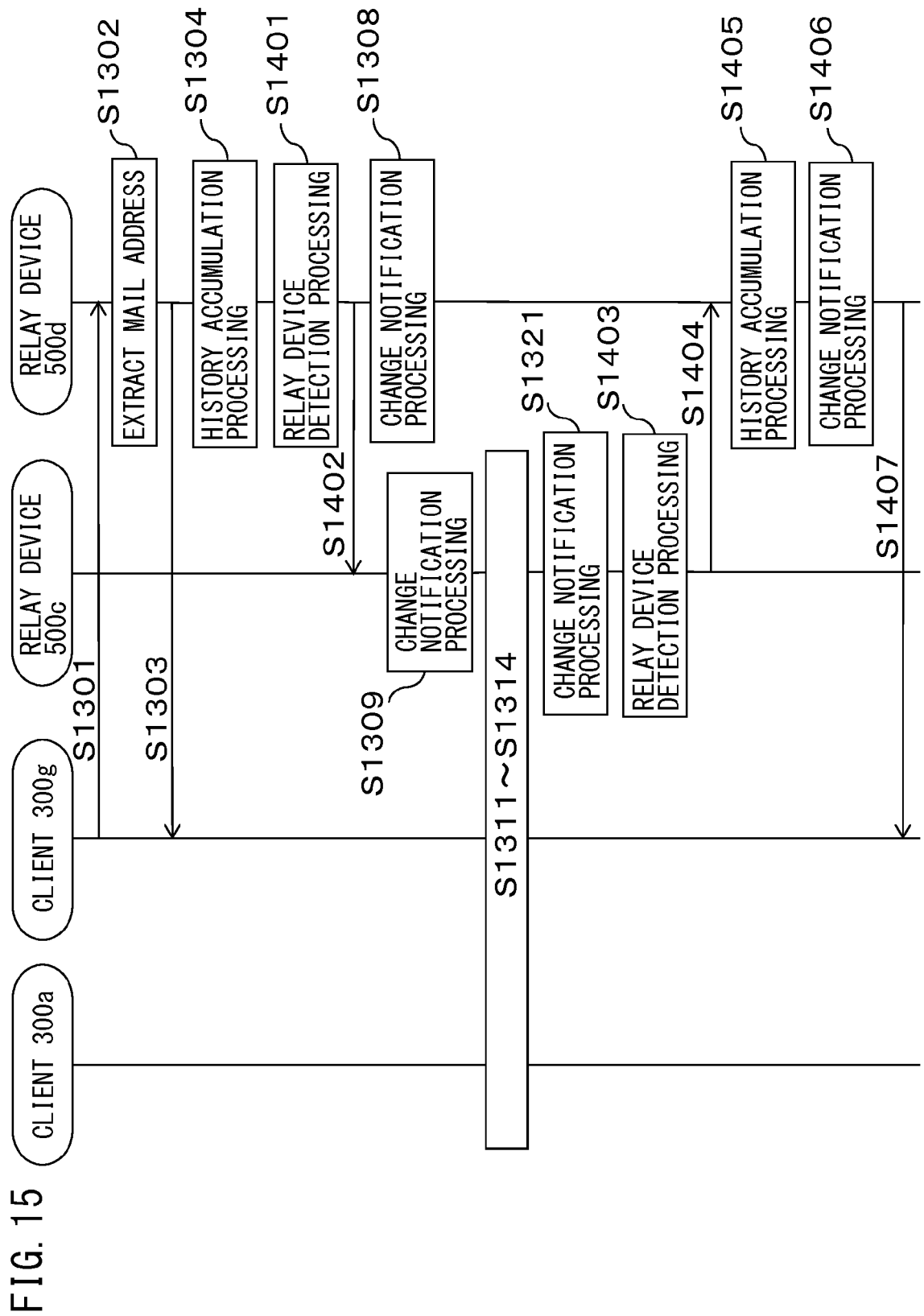
FIG. 15 is a sequence diagram illustrating an example of information processing of a relay device.

FIG. 15 is a sequence diagram illustrating an example of information processing of a relay device. In FIG. 15, the processing to acquire a file from the file server 700 is omitted.

Steps S1301 to S1304, S1308 to S1314, and S1321 are explained using FIG. 13, and therefore, explanation thereof is omitted.

When completing the history accumulation processing at S1304, the relay device 500d detects the other relay device 500c by referring to the relay device management table 990 within the server (S1401). The relay device 500d transmits property information to the relay device 500c (S1402). The relay device 500c performs change notification processing, however, in the example in FIG. 5, the property information transmitted at S1402 is a file whose history is not included in the history table 940. Because of that, there is no entry including the same file name in the history table 940, and therefore, the relay device 500c does not perform notification processing.

The relay device 500c detects the other relay device 500d by referring to the relay device management table 990 within the server (S1403). The relay device 500c transmits property information to the relay device 500d (S1404).

The relay device 500d synchronizes the history table of the relay device 500c and the history table of its own by updating the history table of its own using the most recent version VL based on the received property information (S1405). The relay device 500d reads the history table 940 and searches for an entry whose file name agrees with the file name of the property information received at S1405 and which is older than the entry that is registered (S1406). In the case where there is an older entry, the relay device 500d distributes file update information by a mail to the client 300g having the mail address of the older entry (S1407).

In the conventional system, if each file server performs update check processing of a file stored within the server by polling, the load of the file server increases and further, each file server needs to notify the client of update information, and therefore, the load increases further.

The relay server does not perform history update check processing on its own initiative, and therefore, even in the case where a file of the file server is updated, the relay server does not notify the client of the update information making use of the history on its own initiative.

According to the embodiments, a relay device disclosed herein obviates the need to perform polling processing of the file server that requires a high load and at the same time, brings about the effect that the relay server notifies a client of update information instead of each file server notifying the update information.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a illustrating of the superiority and inferiority of the invention. Although the embodiments of the present invention have been described in detail, it should be understood that the various changes, substitutions, and alterations could be made hereto without departing from the spirit and scope of the invention.

What is claimed is:

1. A relay system which is arranged between a plurality of terminal devices and a file device, comprising:
a plurality of relay devices, each of which is connected to a plurality of the terminal devices via an internal network and arranged between the corresponding terminal devices and the file device, configured to relay, respectively, data communication by each of the plurality of terminal devices to the file device, wherein each of the relay devices includes:
a communication unit configured to perform transmission or reception of data with the file device and a terminal device connected to the relay system; and
a computation processing unit configured to control and cause the communication unit to transmit an acquired change history of data acquired from the file device by a request from the terminal device connected to the communication unit; and
a management device configured to perform transmission and reception of data with the plurality of relay devices via respective communication units therein, including receiving a received change history of first data from any of the plurality of relay devices and transmitting the received change history to another relay device which has relayed second data having the same file name as the first data, and to store the acquired change history of each piece of data acquired from the file device by a request from each of the terminal devices.

2. The relay system according to claim 1, wherein each of the relay devices further includes a storage unit configured to store authentication information including identification information for identifying the terminal device, and
the computation processing unit controls and causes, in a case where the identification information of the authentication information agrees with the identification information included in a request for acquisition from any of the plurality of terminal devices, the communication unit to transmit the request for acquisition to the file device.

3. The relay system according to claim 2, wherein the authentication information includes destination information indicative of the terminal device, and
the computation processing unit controls and causes the communication unit to transmit contents of change of the first data to a terminal device indicated by destination information included in the authentication information and corresponding to the identification information in agreement therewith.

* * * * *